US011138277B2

(12) United States Patent
Ackerman et al.

(10) Patent No.: US 11,138,277 B2
(45) Date of Patent: Oct. 5, 2021

(54) DELIVERY OF PERSONALIZED PLATFORM-SPECIFIC CONTENT USING A SINGLE URL

(71) Applicant: Airship Group, Inc., Portland, OR (US)

(72) Inventors: Daniel Ackerman, Oakland, CA (US); Marc William Carlson, Portland, OR (US); Stefan Schulz, Pacifica, CA (US)

(73) Assignee: Airship Group, Inc., Portland, OR (US)

( * ) Notice: Subject to any disclaimer, the term of this patent is extended or adjusted under 35 U.S.C. 154(b) by 103 days.

(21) Appl. No.: 16/105,773

(22) Filed: Aug. 20, 2018

(65) Prior Publication Data

US 2019/0057161 A1 Feb. 21, 2019

Related U.S. Application Data

(60) Provisional application No. 62/548,359, filed on Aug. 21, 2017.

(51) Int. Cl.
*G06F 16/9535* (2019.01)
*G06F 16/29* (2019.01)
(Continued)

(52) U.S. Cl.
CPC .......... *G06F 16/9535* (2019.01); *G06F 16/29* (2019.01); *G06F 16/955* (2019.01);
(Continued)

(58) Field of Classification Search
CPC .............. G06F 16/9535; G06F 16/955; G06F 16/9566; G06F 16/9537; G06F 16/9554; G06F 16/29; G06K 19/06037
(Continued)

(56) References Cited

U.S. PATENT DOCUMENTS

| 6,862,575 B1 | 3/2005 | Anttila et al. | |
| 8,510,773 B1* | 8/2013 | Abou-Rizk | G06Q 30/0261 725/34 |

(Continued)

FOREIGN PATENT DOCUMENTS

AU 2006200653 A1 3/2006

*Primary Examiner* — Hosain T Alam
*Assistant Examiner* — Nicholas E Allen
(74) *Attorney, Agent, or Firm* — Fenwick & West LLP

(57) ABSTRACT

An adaptive link is generated for delivering a device platform-specific and personalized digital pass. When the adaptive link is activated by an end user, a network request is sent from an end-user device to a digital pass management system. The network request may include header information that identifies the device platform of the end-user device. The digital pass management system extracts query string parameters included in the adaptive link. Based on the parameters, a personalized data set in a specific data format such as JSON is generated. A template that is compatible to the device platform is selected. A digital pass that is compatible with the device platform is generated and delivered based on the requirements of the end-user device. In some cases, the adaptive link may include location information such as latitude and longitude coordinates. The digital pass generated may also be location specific.

20 Claims, 8 Drawing Sheets

(51) Int. Cl.
*G06F 16/9537* (2019.01)
*G06F 16/955* (2019.01)
*G06K 19/06* (2006.01)

(52) U.S. Cl.
CPC ...... *G06F 16/9537* (2019.01); *G06F 16/9554* (2019.01); *G06F 16/9566* (2019.01); *G06K 19/06037* (2013.01)

(58) Field of Classification Search
USPC .......................................................... 707/769
See application file for complete search history.

(56) References Cited

U.S. PATENT DOCUMENTS

| | | | |
|---|---|---|---|
| 9,135,292 B1 * | 9/2015 | Tsun | G06F 16/958 |
| 10,601,940 B2 * | 3/2020 | Onnen | H04L 67/18 |
| 2009/0288012 A1 | 11/2009 | Hertel et al. | |
| 2012/0290440 A1 * | 11/2012 | Hoffman | G06Q 30/0641 |
| | | | 705/26.62 |
| 2013/0054368 A1 | 2/2013 | Grigg et al. | |
| 2013/0226792 A1 | 8/2013 | Kushevsky et al. | |
| 2013/0226816 A1 | 8/2013 | Chory et al. | |
| 2013/0262211 A1 * | 10/2013 | Tomlin, Jr. | G06Q 30/02 |
| | | | 705/14.26 |
| 2013/0332826 A1 * | 12/2013 | Karunamuni | G06Q 10/10 |
| | | | 715/273 |
| 2013/0346302 A1 | 12/2013 | Purves et al. | |
| 2014/0019352 A1 | 1/2014 | Shrivastava | |
| 2014/0172956 A1 * | 6/2014 | Varney | H04L 41/0893 |
| | | | 709/203 |
| 2014/0257747 A1 | 9/2014 | Repenning et al. | |
| 2015/0065107 A1 | 3/2015 | Dave et al. | |
| 2015/0281395 A1 * | 10/2015 | Pandiarajan | H04L 67/322 |
| | | | 709/219 |
| 2016/0012465 A1 | 1/2016 | Sharp | |
| 2016/0034990 A1 * | 2/2016 | Kannair | G06Q 30/0609 |
| | | | 705/51 |
| 2016/0104079 A1 * | 4/2016 | Greenberg | G06F 3/04845 |
| | | | 705/5 |
| 2016/0171530 A1 * | 6/2016 | Sa | G06Q 30/0251 |
| | | | 705/14.49 |
| 2017/0310623 A1 * | 10/2017 | Sjolander | H04L 51/16 |
| 2017/0329499 A1 * | 11/2017 | Rauschenbach | G06F 3/04845 |
| 2018/0039621 A1 * | 2/2018 | Scronce | G06F 3/04817 |
| 2018/0225267 A1 * | 8/2018 | Warner, Jr. | G06F 16/9566 |
| 2018/0232352 A1 * | 8/2018 | Fulford | G06F 40/166 |

* cited by examiner

DELIVERY OF PERSONALIZED PLATFORM-SPECIFIC CONTENT USING A SINGLE URL

CROSS REFERENCE TO RELATED APPLICATION

This application claims the benefit of U.S. Provisional Application No. 62/548,359, filed Aug. 21, 2017, which is incorporated by reference in its entirety.

TECHNICAL FIELD

The disclosure generally relates to cross-platform delivery of content items, and more specifically, the disclosure relates to how digital passes are generated, personalized, and delivered to different end users whose devices operate on different platforms.

BACKGROUND

Digital passes include digital content items such as digital boarding passes, digital coupons, digital tickets, digital identifiers, etc. Digital passes are often stored in a mobile software application of an end-user device. In order for an end user to use digital passes, the passes often need to be installed. However, the data within the passes may need to be personalized based on various circumstances.

SUMMARY

Disclosure described herein relates to systems, methods, and processes for delivering digital passes to different end-user devices that operate on different device platforms (e.g., different computing operating systems). A company often desires to distribute a series of digital passes that are related to the same transaction (e.g., same flight number, same promotion event, etc.) to different end users. As such, digital passes are often personalized based on different conditions. For example, digital passes often contain user identification and location-specific information. Also, while images of digital passes issued by the same company might look alike, the file format and the delivery mechanisms are often different for digital passes that are equivalent but are generated for different end-user device platforms.

In accordance with one embodiment, a digital pass management system enables companies (also referred to as the system customers) to distribute digital passes through the system to different end-user devices that operate on different device platforms in a streamlined process. The process allows a system customer to initiate a digital pass delivery process without knowing specific information about the end-user device such as the specific device platform on which the end-user device runs. Hence, the system customer does not need to have a complex system infrastructure to deliver its digital passes. The process also allows the system customer to customize the layout of the digital passes. For each particular instance of pass issuance, the system may personalize each digital pass in a direct and convenient manner, for example, by transmitting the personalized data for the digital pass to the digital pass management system using key-value pair parameters that can be easily included in a uniform resource locator (URL). From the perspective of an end user, the process allows the end user to easily install a digital pass through an activation of a single link without specifying the model of the end-user device or the device platform on which the end-user device runs. The process streamlines the experiences of both the end user and the system customer.

By way of example, a digital pass management system may store two or more digital pass templates that are provided by a system customer. A first digital pass template is compatible with a first device platform (e.g., an APPLE iOS operating system) while a second digital pass template is compatible with a second device platform (e.g., a GOOGLE ANDROID operating system). A particular instance of digital pass issuance and delivery may begin when an end user interacts with the system customer and requests a digital pass. In turn, a URL that is directed to the digital pass management platform is sent to the end-user device. The URL may be sent from the system customer directly or from the digital pass management system upon a request from the system customer (e.g., through an API call or through a front-end interface of the digital pass management system).

When the end user activates the URL, the digital pass management system receives a network request from the end-user device. The network request (e.g., an HTTP request) may include information such as a user agent string in the header of the request that identifies the device platform on which the end-user device runs. Based on the information, the digital pass management system selects a digital pass template. In turn, the digital pass management system generates a device platform-specific digital pass payload that is compatible with the device platform using the selected template and deliver the payload in accordance with the requirement of the device platform.

In accordance with an embodiment, the URL that is sent to the end-user device may include data that personalizes the digital pass. The data may take the form of key-value pairs that are included in the URL as query string parameters. The query string parameters may include data related to the barcode of the digital pass, location information of the end-user device, and administrative information such as an external identifier of the digital pass and metadata tags. The query string parameters may also include system customer defined keys that correspond to personalizable data fields in the digital pass template. The query string parameters included in the URL may affect the personalization of the digital pass in different ways. Some values of the parameters are directly included in the digital pass (e.g., values that are identified by keys that match the customizable fields in the digital pass template). Other values may be translated into different objects displayed in the digital pass (e.g., a barcode value may be translated into a QR code image). Yet other values may affect the versions of the digital pass. For example, latitude and longitude values of the end-user device, which may be obtained from the query string parameters or determined by the Internet protocol (IP) address of the end-user device, may result in a location-specific digital pass.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 is a block diagram illustrating a system environment for managing and delivering digital passes, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Described relates to a processing system configured to enable the creation and/or delivery of personalized content such as digital passes that will be handled differently according to the end-user device, location, and/or application where the personalized content will be forwarded. Digital passes may sometimes also be referred to as digital wallet assets.

Figure 1:
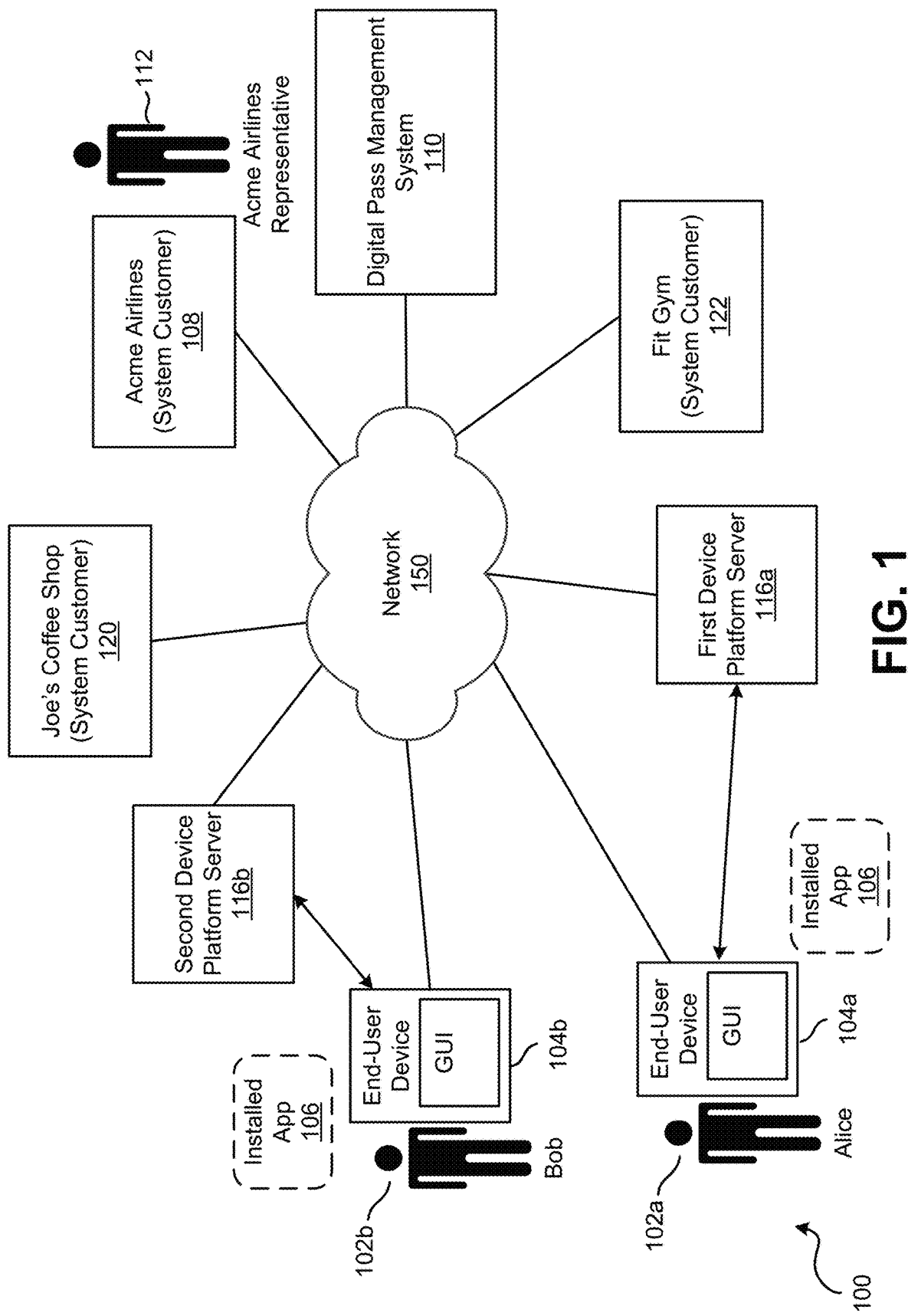

Referring now to FIG. 1, shown is a block diagram illustrating an embodiment of an example environment 100 for digital pass management. By way of example, FIG. 1 shows an embodiment in which digital pass management system 110 may facilitate the creation, management, and distribution of digital passes on behalf of its customers or partners. For this example and for ease of discussion, consider that the digital pass management system 110 provides digital pass management services to a variety of customers or partners, including various companies such as Acme Airlines 108, Joe's Coffee Shop 120, and Fit Gym 122. Those companies may commonly be referred to as the system customers. In some embodiments, instead of contracting with a digital pass management system, companies may operate their own internal digital pass management systems, and digital pass management is adapted accordingly. Also, a customer of the digital pass management system 110 may alternatively, or additionally be individuals or any other suitable entities.

The network 150 may take the form of the Internet or any intranets. The network 150 may use any combination of cellular networks, wide area networks, and/or local area networks with wired and/or wireless communication systems. For example, the network 150 includes communication links using technologies such as Ethernet, 802.11, worldwide interoperability for microwave access (WiMAX), 3G, 4G, 5G, code division multiple access (CDMA), digital subscriber line (DSL), etc.

The environment 100 includes various end-user devices 104a and 104b connected to the network 150. End-user devices may include mobile devices such as smart phones, tablets, personal digital assistant (PDA), wearable electronic devices (e.g., smart watches), etc. End-user devices may also include other computers such as laptop computers and desktop computers. The end-user devices may execute various software applications that provide graphical user interfaces to receive input from the end-user and display various content items. One software application is a digital pass application, which may store various digital passes from different companies. A digital pass application is sometimes referred to as a digital wallet. Digital passes may include digital boarding passes, digital coupons, digital tickets, digital identifiers, digital payment cards, etc.

End users 102a and 102b and other end users use different devices that operate on different device platforms. A device platform may refer to an end-user device's system software such as the operating system. Common platforms for mobile devices include APPLE iOS, GOOGLE ANDROID, BLACKBERRY OS, MICROSOFT WINDOWS, etc. Other device platforms may include computer operating systems such as APPLE OS, MICROSOFT WINDOWS, RED HAT LINUX, etc. In some situations, a platform may also be a software application that provides a digital wallet feature. For example, some social networking applications (e.g., TENCENT WECHAT, FACEBOOK MESSENGER, WHATSAPP, etc.) may provide digital wallet features in applications. In the environment 100, user 102a Alice may use an end-user device 104a that runs on a first device platform while user 102b Bob may use an end-user device 104b that runs on a second device platform that is different from the first device platform. Due to the differences in the design and operation of different device platforms, equivalent digital passes (those issued by the same company for similar contents, transactions, events, and/or purposes) that are made for different device platforms may be in different file and data formats and the delivery of those passes to different device platforms may likewise be different. Common digital pass delivery mechanisms often involve the use of push notifications, which may be regulated by device platform publishers such as companies like APPLE, GOOGLE, SAMSUNG, and MICROSOFT. For example, a first device platform server 116a may regulate the push notifications of end-user devices that operate on the first device platform while a second device platform server 116b may regulate the push notifications of end-user devices that operate on the second device platform. Common examples of the first and second device platform servers 116a and 116b include APPLE Push Notification Service (APNS) and GOOGLE Cloud Message. An end-user digital pass application or digital wallet may also be a feature or application in another application, such as TENCENT that may include a digital wallet within the WECHAT application. The platform of those applications such as WECHAT might have a different digital pass delivery requirement that is regulated by TENCENT.

The overall interaction of various devices, servers, and parties in the environment 100 is explained using an example instance of an installation of a digital boarding pass. However, this disclosure is by no means limited to a delivery of boarding passes. As a system customer, Acme Airlines 108 has partnered with the digital pass management system 110 to handle the management of a variety of digital passes, such as digital frequent flier cards, digital boarding passes, etc. For example, using the digital pass management system 110, Acme Airlines representative 112 has configured, via a web interface to the digital pass management system 110, a template for an Acme Airlines boarding pass, specifying the various fields that it will include, such as the passenger name, flight number, gate number, frequent flier number, boarding pass barcode, or any other appropriate flight information, the design of the boarding pass, as well as how the boarding pass should be rendered on the display of a device. As part of the template configuration process, the representative also may specify the fields that personalizable (e.g., passenger name, flight number, departure/arrival time, gate number, etc.), as well as specify metadata tags that may be used to identify and locate boarding passes that potentially need to be updated in the future (e.g., identifying boarding passes by flight number).

End user Alice 102 is an Acme Airlines flier and is heading to the airport to catch her flight. Alice has used her end-user device 104, such as a smart phone, to check into her flight, for example, via the Acme Airlines website, or via an Acme Airlines application 106 that Alice has installed on her phone.

Upon receiving an indication that Alice has checked into her flight, Acme Airlines 108 would like a digital representation of her boarding pass to be installed in a digital pass in her phone, which she can subsequently display (e.g., for scanning) in order to board her flight. Upon a request from Alice or as a part of an automatic response of Acme Airlines 108 to the check-in, Acme Airlines 108 communicates (e.g., via an Application Programming Interface (API)) with the digital pass management system 110 to facilitate the process of generating and delivering Alice's digital boarding pass. An adaptive link is sent to Alice's end-user device 104. The system customer Acme Airlines 106 may directly send the adaptive link or may cause the digital pass management system 110 (e.g., through a call of API command) to send the adaptive link to Alice's end-user device 104. Upon the activation of the adaptive link (e.g., Alice clicking on the adaptive link), a network request is created and sent to the digital pass management system 110. The digital pass management system 110 evaluates the incoming network request, including information that is included in such as header, Internet Protocol (IP) address, and query string parameters that may present in the adaptive link to extract data in order to build the digital pass and redirect end users to an appropriate network destination. In turn, a digital pass is delivered to Alice's end-user device 104 and is capable of being displayed in a digital wallet that is presented in the form of a GUI. The first device platform server 116a may or may not involve in delivering the digital board pass, depending on the implementation of the first device platform and how a digital pass is delivered for devices that run on the first device platform. The foregoing descriptions regarding the generation and delivery of the digital pass will be described in further detail below in associated with FIGS. 4-7.

As will be described in more detail below, the workflows and mechanisms for a generation, installation, and distribution of digital passes may depend on a variety of factors and may be adapted accordingly based on factors such as the device platforms of end-user devices to which passes are to be sent.

Digital Pass Management System

Figure 2:
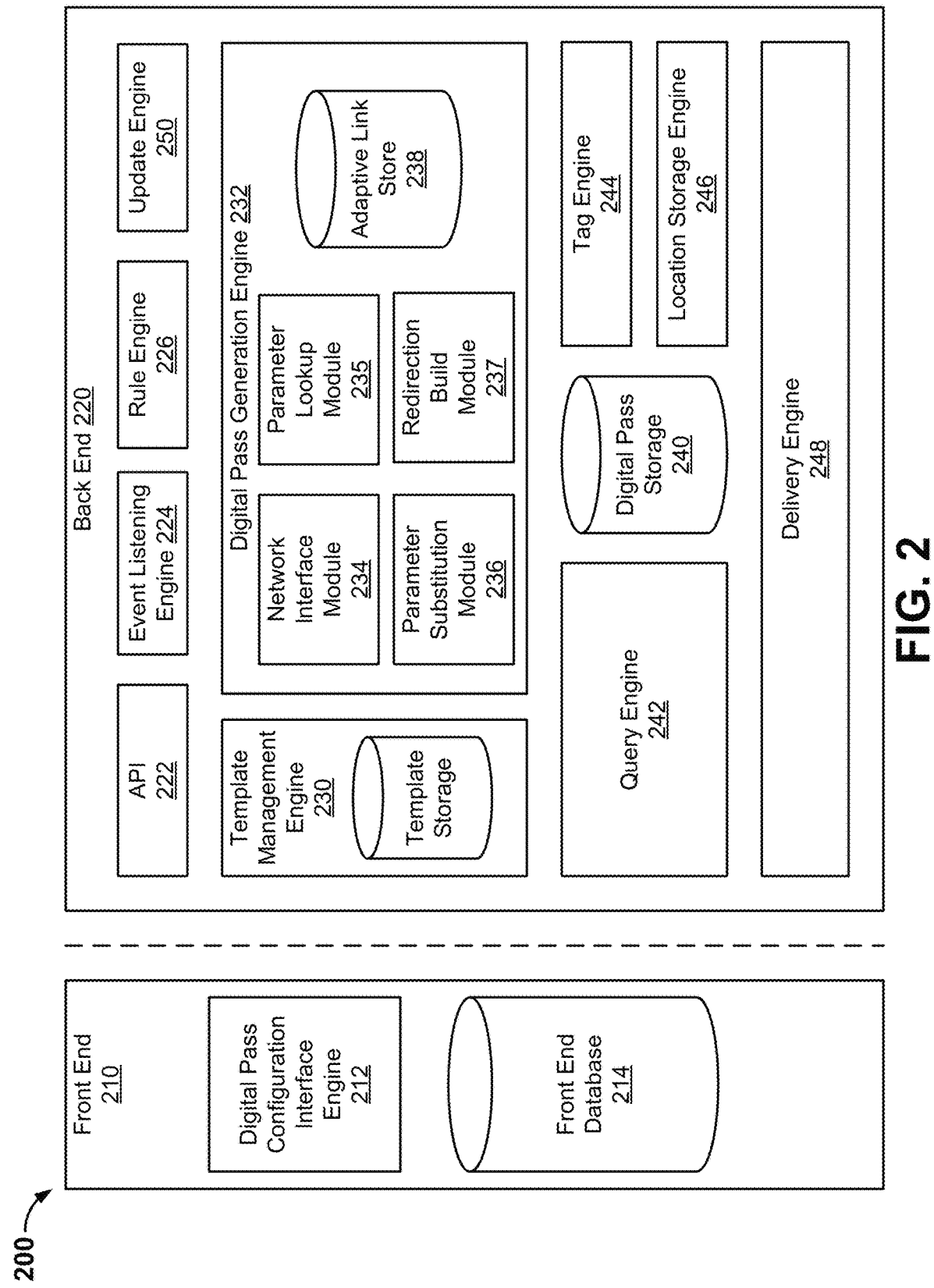
FIG. 2 is a block diagram illustrates a digital pass management system, in accordance with an embodiment.

FIG. 2 illustrates an example of an embodiment of a digital pass management system. In some embodiments, the digital pass management system 200 is an example of a digital pass management system 110 of FIG. 1.

The digital pass management system 200 includes a front end computing system (or front end) 210 and a back end computing system (or back end) 220. The front end 210 includes digital pass configuration interface engine 212 and front-end database 214. The back end 220 includes application programming interface (API) 222, event listening engine 224, rule engine 226, template management engine 230, digital pass generation engine 232, digital pass storage 240, query engine 242, tag engine 244, location storage engine 246, delivery engine 248, and update engine 250. In various embodiments, the digital pass management system 200 may include additional, fewer, or different components for various application.

In various embodiments, front end 210 provides a customer-facing view (e.g., web user interface) of the digital pass management system 200 that may be used to access various processes performed or supported by system backend 220 (e.g., via an API). The front end may also provide customer support services, such as authentication management and maintaining of customer preferences. An encryption layer also may be provided, as applicable.

Digital pass configuration interface engine 212 is configured to provide a front-facing interface with which a customer of the system (e.g., Acme Airlines representative) may interact with in order to configure digital pass management. For example, the Acme Airlines representative may access/login to the digital pass management system 200 via a web user interface in order to access a customer account on the platform 200 and perform pass management activities.

In some embodiments, the digital pass configuration interface engine 212 provides a template composer interface, which provides the system customer with an interactive interface to create and modify templates for digital passes. Via the template composer interface, a system customer (e.g., a company) can create templates for a variety of digital passes, such as boarding passes, digital coupons, etc. In some embodiments, templates comprise models/structures that can be populated with actual data to generate logical instances of the template, which are logical representations of actual passes that are ultimately installed on an end user/entity's mobile device. Templates may be designed from scratch, or developed from default templates. A company sometimes develops different templates for different end-user devices that operate on different device platforms due to the differences in the device platforms such as form factors.

In some embodiments, the actions taken via the front end are translated into API calls to the back end 220 to effect digital pass management. For example, the actions taken in a template composition interface may be converted into API calls to template management engine 230 of the backend, resulting in template composition backend processes being performed (e.g., the creation of template data structure).

Backend 220 provides a backend infrastructure for processes and workflows of the digital pass management system 200. The digital pass management system backend infrastructure may be implemented, for example, on a Linux server, running an HTTP endpoint, which parses requests (e.g., API calls via API 222) that are made in the JavaScript Object Notation (JSON) format, and provides responses also in the JSON format. The data (e.g., images, text, key-value pairs, etc.) included in the body of the JSON requests/responses may be binary data in base64 encoded JSON. The various components and engines of the backend infrastructure may communicate/coordinate with each other via a message bus implemented, for example, using a Kafka queue. Other configurations and implementations of a digital pass management system are possible.

The components of the backend infrastructure may be accessed via front end 210, directly via API calls to the backend system, or via any other appropriate channels. For example, while a system customer can perform pass management via interaction with a web UI, the system customer can also have code that directly calls into the backend infrastructure via API 222 in order to cause template instance generation, update calls, provide data to the backend, etc. In some embodiments, the backend infrastructure is configured to call into customer systems (e.g., customer relations management systems, databases, etc.) to retrieve information. The communication between the pass management system backend and the customer may be authenticated. In the example shown, a single API 222 is shown which may be published and used to access the backend system, however, there may be more than one API to communicate with various components of the management system infrastructure.

Event listening engine 224 is configured to listen for and observe incoming events to the backend infrastructure. Examples of event information may include user related events and system customers events. For example, a system customer may transmit data and information regarding a relevant event to the system 200 through an API call. In response to the receipt of one or more events, the system 200 may take different actions.

Rule engine 226 is configured to facilitate ruleset definitions and rule-driven initiation/triggering of pass management actions/workflows based on an evaluation of observed events and defined rulesets. For example, a system customer may identify a series of related digital passes by an identifier. The system customer may define a ruleset that limits the total number of digital passes associated with the identifier can be generated. In another example, a system customer may define a ruleset that can generate variations of digital passes based on locations that are defined by the system customer.

Rulesets may be configured/defined (e.g., by a customer/owner of the management pass system) via a user interface such as digital pass configuration interface engine 212 of front end 210, as well as specified directly via an API call to the rule engine. In some embodiments, a ruleset comprises a dynamic set of rules/logic used to determine an appropriate action/workflow to take. Defining a ruleset may include defining a series of expressions that are to be applied to observed events and the appropriate actions/workflows to initiate in the event that criteria of the ruleset are matched by an observed event. Multiple rulesets may be defined for various scenarios.

Template management engine 230 is configured to facilitate the configuration of digital pass templates. In various embodiments, template management/configuration may be performed via an interface such as one provided by digital pass configuration interface engine 212, or via direct API calls to the template management engine. In some embodiments, the template management engine includes template storage, which is used to store the various template models/data structures of the pass that a system customer has created/composed. Additionally, corresponding information, such as identifiers for the templates (e.g., serial numbers which may be used for retrieval when creating instances of a template), template content (e.g., text, headers, footers, etc.), and any media to be included in the template (e.g., logos, images, etc.) also may be stored in the template storage. The template management engine also may be configured to perform manipulation of items associated with templates, for example, compression of large image files to be included in digital passes. The template management engine also may be configured to facilitate the testing of digital pass configuration, for example, by performing test installations/updates of passes derived from the template on mobile devices in order to verify how an actual pass will appear on a device.

The digital pass generation engine 232 is configured to facilitate the generation of device platform-specific digital pass payloads. Digital pass payloads may be data that are used to create the digital pass. Different device platforms may require different formats, packages, processing, and delivery of payloads. The installation of a digital pass may be initiated by an adaptive link in the form of an URL. For example, when Alice wants to install a boarding pass on her phone, Acme Airlines can send the URL to Alice. When Alice clicks the URL, a network request (e.g., HTTP request) is sent and the request results in an API call to the pass management backend 220 to request the creation of Alice's instance of the boarding pass template. The network request also may include information that identifies the device platform of Alice's end-user device. A boarding pass payload that is in a format appropriate to the device platform of Alice's end-user device (e.g., iOS, ANDROID, etc.) is generated. A device platform-specific pass may be delivered to Alice's end-user device based on the delivery mechanism set forth by the device platform (e.g., through a push notification).

The digital pass generation engine 232 may include different modules are responsible for different processes in generating digital pass payloads. The digital pass generation engine 232 may include a network interface module 234, a parameter lookup module 235, a parameter substitution module 236, a redirection build module 237, and an adaptive link store 238.

The network interface module 234 processes the header of incoming network requests (e.g., HTTP request) sent from an end-user device. The network interface module 234 extracts information such as user agent data that identifies the device platforms of the end-user devices that send the network requests, IP (Internet Protocol address) data, the adaptive link path and query string parameters. The query string parameters may include data such as personalized information, metadata, tags, adaptive link identifier (ID) that are identified by one or more key-value pairs included in the URL that was sent to an end-user device. The network interface module 234 stores those data for later use within the parameter lookup module 235 and the redirection build module 237.

The parameter lookup module 235 interprets data that are included in query string parameters, including any adaptive link IDs, stored via the network interface module 234. The parameter lookup module 235 then matches each parameter against the parameters defined in previously configured digital pass templates. Matched parameters are used to personalize the digital pass. Additionally, or alternatively, the IP address stored by the network interface module 234 may be automatically translated into a set of latitude and longitude coordinates. Matched parameters, latitude and longitude data, and any adaptive link IDs are stored for use within the parameter substitution module 236.

The parameter substitution module 236 interprets parameters, latitude and longitude coordinates, and an adaptive link ID stored by the parameter lookup module 235. In generating a digital pass payload, the parameter substitution module 236 substitutes the values for parameters into their corresponding locations as defined in the template. In addition, the latitude and longitude are measured against a pre-defined list of locations stored in location storage engine 246 to return one or more locations that match the latitude and longitude within a certain pre-defined limit of distance (e.g., maximum radius in miles) and/or within a total number of locations limited by the system customer. Based on the location rules defined in the rule engine 226 and/or location storage engine 246, the digital pass payload is personalized. A final schema is forwarded on to the redirection build module 237 alongside the adaptive link ID.

The redirection build module 237 interprets the user agent information stored by the network interface module 234 to identify the device platform of the end-user device to which the digital pass is delivered. The redirection build module 237 also accesses schema data stored by the parameter substitution module 236. In some cases, a company may specify a total pass count ceiling for a particular series of passes that are commonly identified through an external identifier or metadata tag. In such cases, the redirection build module 237 also evaluates whether the total pass count is over the maximum allotted passes as defined. If the company does not specify a total pass ceiling or the total pass count is not in excess of the maximum allotted passes, the redirection build module 237 returns a "302-redirect" network response back to that appropriate resource through the network interface module 234. If the total pass count is over the maximum allotted passes, the redirection build module 237 may stop the generation of a pass and/or provide information to the end-user that no more pass can be generated.

The adaptive link store 238 provides a creation and lookup resource for defining schemas, customized query string parameters, per-platform actions, known locations, and other defining elements such as maximum radius, whether multiple users clicking on the same link should be treated as different individuals or counted as one, or total pass count ceiling.

Pass storage 240 may be configured to store digital passes. In some embodiments, pass storage 240 comprises specialized storage configured to process static data items of large capacity (e.g., passes with large media) at high throughput and low latency. One example implementation of pass storage 240 is AMAZON S3. Mobile platform-specific passes generated may be stored in the digital pass storage 240. Additional information corresponding to the platform-specific passes, such as cryptography, may also be stored in the digital pass storage 240.

Query engine 242 is configured to communicate with and query multiple backend databases of various types, such as template storage, pass storage 240 and location storage engine 246. A system customer can query to find devices (e.g., represented by device identifiers), pass templates, logical pass instances, generated digital passes, etc. that match the criteria of a search query. The search query may specify tags of interest, location dimensionality of interest (e.g., latitude/longitude, geographical region), time dimensionality of interest, etc. In some embodiments, a search request query may include Boolean logic operators (e.g., conjunction/AND, disjunction/OR, negation/complement/exclusion/NOT, XOR, etc.) used to further refine returned results.

Tag engine 244 is configured to store and maintain tag information and associations for pass segmentation purposes. Tags may sometimes also be referred to as metadata tags. In some embodiments, tags may be assigned by the system customer (e.g., a company) to a set of multiple digital passes and/or digital passes templates to allow the system customer to manage and classify the digital passes. For example, if the system customer is a retail shop, the system customer may create a tag for digital passes that are related to a certain product or category of product. This allows passes and/or templates of the passes that are associated with a tag to be updated together. Tags also allow passes and/or templates to be retrieved through the query engine 242. For example, the retail shop system customer may specify one or more tags such as "video game" and "sport" to retrieve passes and/or templates that are related to both tags.

In some embodiments, location storage engine 246 is configured to communicate with rule engine and 226 and query engine 242 to facilitate the determination of whether location criteria specified by a set of rules is met by an observed event. For example, as part of a rule used to determine the exact sales details to which an end user is entitled in a nationwide sales event that varies among different geographical locations, a retail store chain may define rules that divide an area (e.g., the nation) into certain sub-locations and the sales event details on the sub-locations.

Delivery engine 248 may be configured to facilitate the delivery of digital pass payloads to end-user devices. In one case, delivery engine 248 may provide the payload in accordance with the requirements of different device platforms. For example, the payload may be provided to APPLE Push Notification Services (APNS), which mediates and facilitates communications/messaging with iOS mobile platform devices. The payload may also be provided to GOOGLE Cloud Messaging (GCM), which mediates and facilitates communications/messaging with ANDROID mobile platform devices. Each mobile operating platform may require digital pass payloads to be configured in a particular format, and have different protocols regarding authentication, retry policies, etc. that are specific to the mobile platform, and the respective adaptors can configure messages to be delivered accordingly.

Update engine 250 is configured to facilitate the updating of digital passes after the initial digital passes are installed on end-user devices. Updating digital passes includes updating the content (e.g., images, text, etc.). For a more detailed description of updating digital passes, U.S. patent application Ser. No. 14/621,302, entitled "Updating Digital Wallet Assets" and filed on Feb. 12, 2015, is incorporated by reference in its entirety for all purposes.

The engines and modules described above can be implemented as software components executing on one or more general purpose processors, as hardware such as programmable logic devices and/or Application Specific Integrated Circuits designed to perform certain functions or a combination thereof. Each component shown in FIG. 2 may be configured to operate within the context of a processing system, for example, as illustrated and described with FIG. 8. In some embodiments, the engines can be embodied by a form of software products which can be stored in a non-volatile storage medium (any non-transitory computer readable medium such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-engines.

The various components and engines of the digital pass management system can be operated by a single entity or multiple entities and split accordingly. For example, in a first scenario, an entity such as Acme Airlines can perform both pass creation and pass delivery, while in a second scenario, Acme Airlines can perform pass creation, but have a separate entity perform the delivery of the pass on behalf of the airline.

Digital Pass Templates

Figure 3:
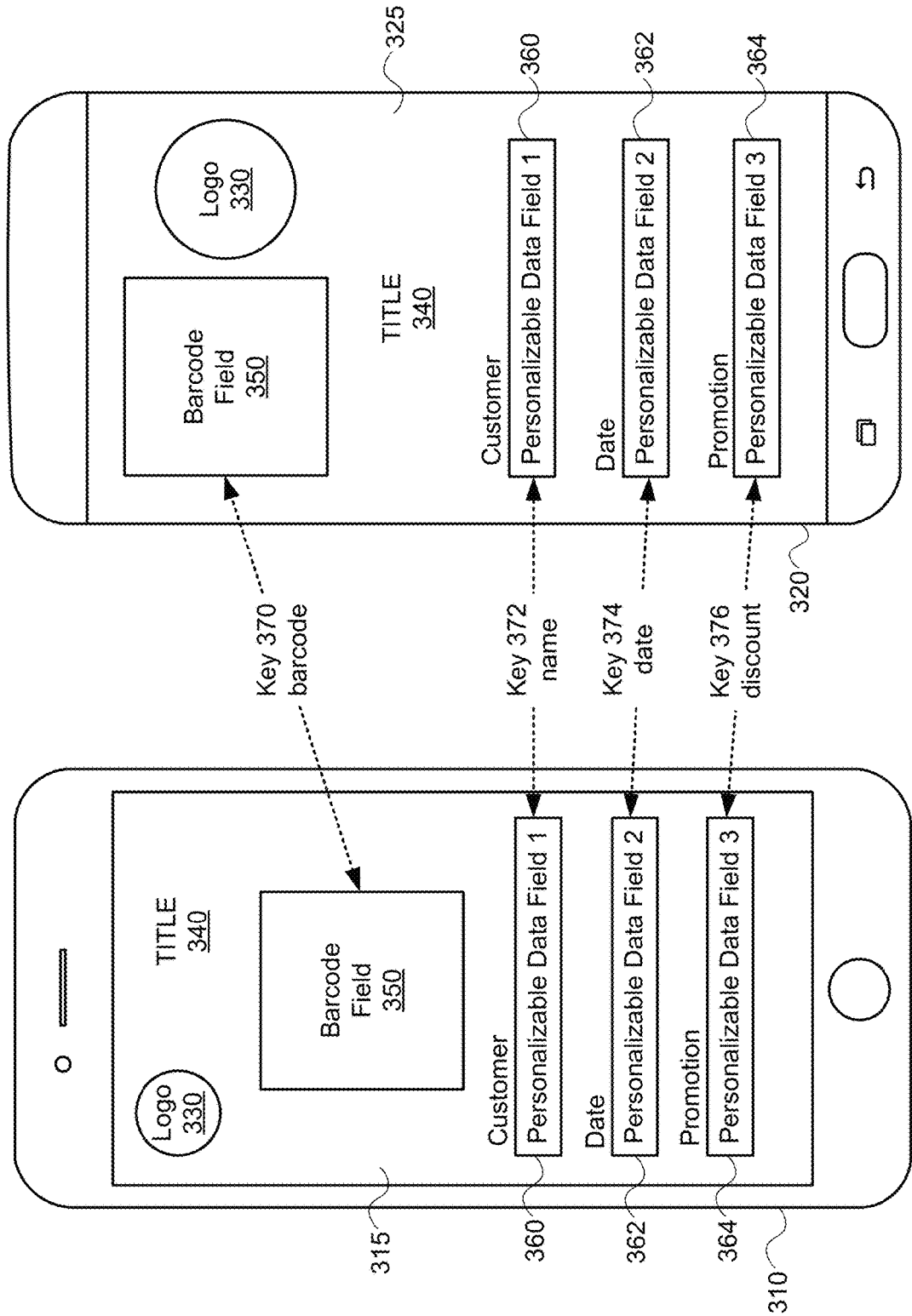
FIG. 3 illustrates two different digital pass templates that are designed for different end-user device platforms, in accordance with an embodiment.

FIG. 3 shows some example visual illustrations of digital pass templates that are made for different device platforms, in accordance with an embodiment. FIG. 3 shows two different end-user devices 310 and 320. The first end-user device 310 may operate on a first mobile device platform (e.g., iOS) and the second end-user device 320 may operate on a second mobile device platform (e.g., ANDROID) that is different from the first mobile device platform. Owing to the differences in the digital pass requirements of file format, screen form factor, compatibility, etc., each device platform has its own digital pass template for an equivalent digital pass. For example, a first template 315 is compatible with the first mobile device platform while a second template 325 is compatible with the second mobile device platform. A digital pass management system customer (e.g., a company such as 108, 120, 122 in FIG. 1) may create and modify one or more templates of digital passes through the digital pass management system's front end interface (e.g., 212 in FIG. 2) or through API calls. The system customer may create and modify the templates based on the customer's own preferences and designs.

A digital pass template 315 (or 325) may include graphical elements and/or text that are common to different digital passes that are generated based on the template. The digital pass template 315 also may include personalizable data fields that change in different digital passes. Graphical elements are visual or layout elements such as the background and logo 330. Those graphical elements are usually defined by the template and are fixed among different digital passes that are generated based on the template, although in some templates there are rules to change or randomize some of those graphical elements. The digital pass template 315 also may include fixed texts such as the words "Customer," "Date," and "Promotion" in this example. The title 340 and logo 330 also may be fixed or variable, depending on the design of the template. Personalizable data fields are fields that are customizable based on individual digital passes so that each pass can be tailored to different end-user. In this example, barcode field 350, personalizable data fields 360, 362, and 364 are examples of personalizable data fields. Each personalizable data field is identifiable by a parameter key. For example, the barcode field 350 is identified by the key 370 "barcode." Likewise, personalizable data fields 360, 362, and 364 are respectively by the key 372 "name," key 374 "date," and key 376 "discount." As it will be discussed in further details below in associated with FIGS. 5 and 6, some keys are reserved for a specific field and the name of the key is not customizable, while other keys are defined and customizable by the creator of the digital pass template 315 (i.e., the system customer). For example, in the embodiment shown in FIG. 3, the key 370 "barcode" is reserved for the barcode field 350 while other keys 372, 374, and 376 are customer defined. In other words, the system customer may change key 372 "name" to "name123," etc. to identify the personalizable data field 372.

While the templates 315 and 325 in FIG. 3 show one or more personalizable data fields, in some embodiments a digital pass template does not need to contain any personalizable data field. For example, a company may want to mass produce a digital promotional coupon for the public. Depending on its design, such a digital pass may not need to include any personalized data.

The digital pass template 325 is an equivalent version of the digital pass template 315 but is compatible with a second mobile device platform. An equivalent version of digital passes refers to different digital passes that are installed in different device platforms but serve the same or similar purpose (e.g., same board pass, same discount coupon barcode, same personal ID, etc.). In the particular examples shown in FIG. 3, the first digital pass template 315 and the second digital pass template 325 have different layouts, such as in the placements of the title 340 and the logo 330 and in the size of the logo 330. In some cases, both templates for different device platforms may have essentially the same visual layout (e.g., they look substantively identical), but the underlying data format and delivery mechanisms of the digital passes generated are still different because of the different device platforms. The digital pass template 325 have the same or similar personalizable data fields 350, 360, 362, 364 that are identifiable by the same parameter keys 370, 372, 374, and 376. In some cases, a digital pass template may include less personalizable data fields than other equivalent templates. For example, in one embodiment, a third template (not shown in FIG. 3) may be designed for a wearable electronic device (e.g., a smart watch) that has a small display. For the third template, only the barcode field 350 is present and most of the other texts and graphical elements are removed.

Also, while the example digital pass templates shown in FIG. 3 contain visual elements such as logos, barcode, and texts, some digital pass does not contain any visual element. Those digital passes can transmit information through a wireless channel such as by encoding the barcode and authentication information in a data package and sending the data through a near-field communication (NFC) protocol.

Device Platform Specific Digital Pass Generation and Delivery

Figure 4:
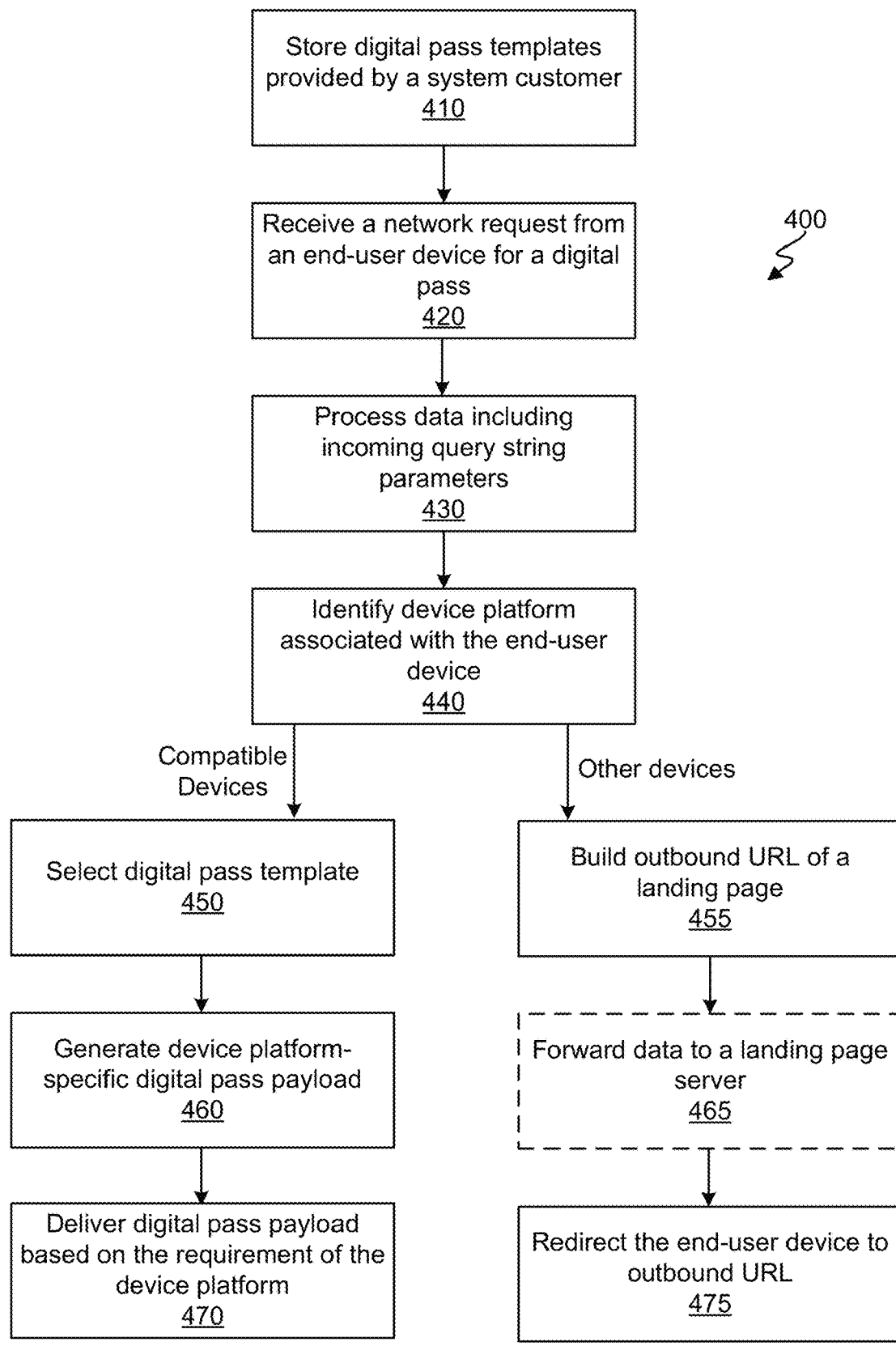
FIG. 4 illustrates a flowchart depicting a process for delivering a platform-specific digital pass to an end-user device, in accordance with an embodiment.

FIG. 4 illustrates a flowchart depicting an example process 400 for generating and delivering device platform-specific digital passes, in accordance with an embodiment. The creation of a digital pass is in response to a demand from an end user or a system customer. The process 400 allows the system customer to initialize a digital pass delivery process without detecting or pre-determining the device platform on which the end-user device runs. The end-user also usually does not need to enter information regarding their end-user device platform or make any selection of device platform.

A digital pass management system provides a configuration interface for its system customers to create and manage digital passes templates. The system customers may design their templates in the configuration interface or may provide the templates to the digital pass management system through one or more API calls. The digital pass management system stores 410 the templates of the customers.

A particular instance of generating and delivering a digital pass to an end user might begin when the end user interacts with a system customer (e.g., a company) of the digital pass management system. For example, an end user may visit the system customer's website and request a digital pass (e.g., a digital coupon) to be delivered to the end-user device. Similarly, another end user may use the system customer's mobile application installed in the end-user device to request a digital pass to the device. Likewise, a third end user may receive a promotional email from the system customer and, in response, requests a digital pass to be installed in the end-user device.

In response to the end user's request, a uniform resource locator (URL) is sent to the end-user device. The URL has a network address that is directed to the digital pass management system and the details of the URL will be further discussed in associated with FIG. 5. In one embodiment, same URL may be sent to an end-user device, regardless of the device platform. Several ways to generate the URL are possible. In a first example way, the system customer may send a request along with the data regarding the information of the digital pass and the personalized information of the end user through one or more API calls. In response, the digital pass management system creates the URL and sends the URL to the end-user device directly or to the system customer for the system customer to forward to the end-user device. In a second example way, a representative of a system customer uses a front-end interface of the digital pass management system to generate the URL. In a third example way, a system customer directly generates the URL and sends the URL to the end user without involving the digital pass management system in the generation of the URL process.

The end user receives the URL such as through a text message, through an e-mail, on the system customer's website, and/or in the system customer's mobile application, etc. In one embodiment, the URL serves as a one-step bootstrap for the creation and installation of the digital pass. In other words, the end user, in such embodiment, does not need to manually enter other information or make any manual selection (such as selecting the end-user device model or device platform) other than activating the URL. After activating the URL, the digital pass will be created and delivered to the end-user device.

By way of example, after the end user activates the URL, the process 400 enables the generation and delivery of the digital pass. The activation of the URL creates a network request from the end-user device. The network request may be an HTTP request or any other suitable network request. The network request may a body that includes the information included in the URL and a header that includes information such as Internet protocol (IP) of the end-user device and a user agent string that identifies the end-user device platform. The digital pass management system receives 420 the network request.

The digital pass management system processes 430 the data needed to generate the digital pass in response to the network request. The data may include general data associated with the digital pass and personalized data that is specific to the end-user. The data may be obtained through different sources. First, the data may be included in the network request. For example, some data may take the form of query string parameters that are included in the URL. Second, some data may be provided to the digital pass management system by the system customer, for example, when the system customer requests the platform to generate the URL. Third, some data may also be stored in the database of the digital pass management system and the URL includes a path that serves as a pointer to identify the location of the data. Other ways to obtain data for the digital pass are also possible. After the data are processed, the data values are saved in accordance with a particular schema. For example, the data values may be saved in accordance with one of the JSON schemas that are defined by the digital pass management system.

The digital pass management system also identifies 440 the device platform of the end-user device, such as by extracting the header information in the network request. In one case, the device platform of the end-user device may be identified in the user agent string included in the header of an HTTP request. Besides the device platform, the digital pass management system may also determine the location information of the end-user device. The location information may be determined through data included in the query string parameters in the URL. For example, the query string parameters may include parameters that specify the longitude and latitude information of the end-user device. Alternatively, or additionally, the location information may be determined through the IP address included in the network request.

Based on the determined end-user device platform, the digital pass management system determines whether the end-user device is compatible with one of the digital pass templates of the system customer. If there is a digital pass template that is compatible with the device platform which the end-user device runs, the digital pass management system selects 450 the template. Based on the data of the digital pass previously processed at step 430 and the selected template, the digital pass management system generates 460 a device platform-specific digital pass payload.

The digital pass payload will be delivered 470 to the end-user device based on the requirement of the device platform. The delivery of the digital pass may depend on the specific implementation governed by the designer of the device platform. The delivery process of common device platforms (e.g., iOS and ANDROID) may involve the use of push notification in different ways. In a first example way to deliver the digital pass, the digital pass payload takes the form of a zip file that includes all data and files required for the digital pass. When the digital pass payload is ready, the digital pass management system pings (e.g., by an API call) a device platform server (e.g., APPLE Push Notification Service (APNS)). The device platform server, in turn, sends a request to the end-user device. When the end-user device picks up the request, the digital pass management system may then directly send the zip file to the end-user device. The data and files included in the zip file will be converted into a digital pass. In another example way to deliver the digital pass, the digital pass payload is created in accordance with another device platform server's requirement. The payload may take the form of certain class and object level information. The digital pass management system may make an API call to the device platform server (e.g., GOOGLE Cloud Message) to transmit the payload to the device platform server. The digital pass management system also sends a 302-redirect network response to the end-user device. The digital pass payload will be sent by the device platform server.

Referring back to element 440 in FIG. 4, if the digital pass management system determines that the device platform of the end-user device is not a mobile platform (e.g., a laptop running non-mobile operating systems), is not a platform that is compatible with any of the digital pass templates of the customer, or is an unknown platform, the digital pass management system builds 455 an outbound URL of a landing page. The landing page may be a website that is pre-set based on the preference of the system customer. For example, the landing page may be a website operated by the system customer that displays a web version of the digital pass. In another example, the landing page may be a website that indicates to the end user that the end-user device is not supported. In some cases, the digital pass management system also may forward 465 the data processed at step 430 to the landing page server. In response, the landing page server may provide a platform specific adaptive link and display the link on the landing page. In building the adaptive link, the landing page server may include query string parameters, forwarded from the digital pass management system, in the adaptive link. Alternatively, or additional, the landing page server may re-direct the end-user to another system or website to obtain the digital pass, and/or send the digital pass to the end user through another method (e.g., by emailing an image of the digital pass to the end user's email address.) After the outbound URL is built and/or the data is forwarded, the digital pass management system sends a redirect network response to redirect 475 the end-user device to the outbound URL.

The process 400 may also be used to deliver digital passes that are not personalized or digital passes that are not originally personalized but are further customizable by the end users (e.g., by value added service provided by APPLE or GOOGLE ANDROID). The exact versions (personalized/ generic/customizable) of the digital passes will depend on the design of the digital pass template and the selection of the system customer.

Figure 5:
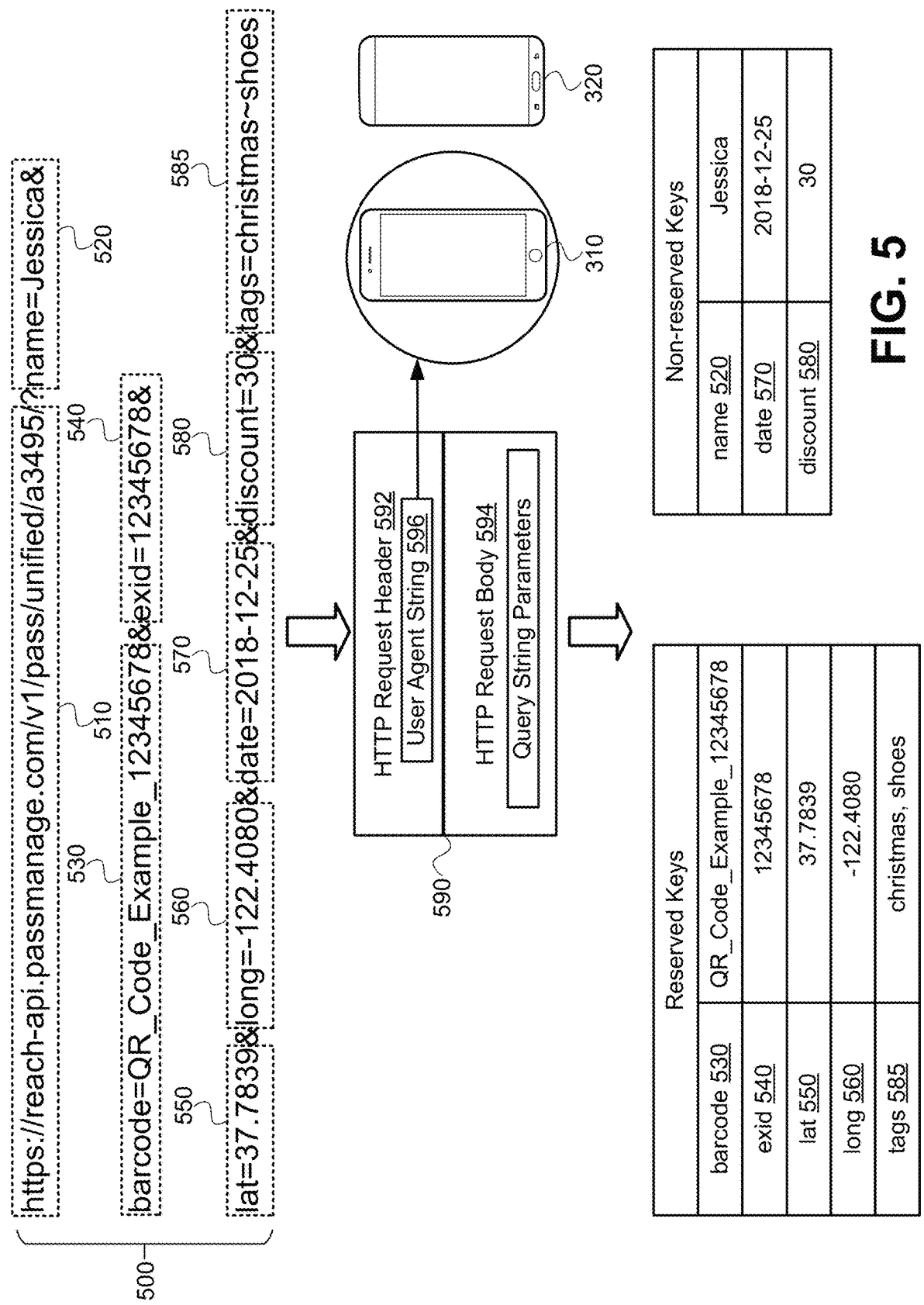
FIG. 5 is a graphical illustration of the generation and processing of a network request for a digital pass, in accordance with an embodiment.

FIG. 5 is a series of graphical illustrations of how digital pass data is extracted from an adaptive link (URL) 500, in accordance with an embodiment. The illustrations in FIG. 5 may correspond to steps 420-440 of the process 400 shown in FIG. 4. The adaptive link 500 is an example URL that is sent to an end-user device. In other words, the adaptive link 500 may correspond to the URL that the end user may activate to send a network request to the digital pass management system as described in step 420 of FIG. 4. The adaptive link 500 includes a path 510 and may additionally include one or more query string parameters 520, 530, 540, 550, 560, 570, 580, and 585. The path 510 is a network path that points to a particular location. The path 510 may be directed to a digital pass management system and may take the form of a pointer that identifies location(s) of the data relevant to the generation of the digital pass. Alternatively, or additionally, the adaptive link 500 may also carry data for the digital pass in the form of query string parameters.

Query string parameters are positioned in the adaptive link 500 after the path 510 and are separated from the path 510 by a predefined symbol such as "?" in the case of FIG. 5. Query string parameters are separated from each other by another predefined symbol such as "&" in this case. Each query string parameter is a key-value pair that includes a key and a value that is separated by a symbol "=" in this case. For example, the query string parameter 520 has a key "name" and a value "Jessica." Likewise, the query string parameter 530 has a key "barcode" and a value "QR_Code-_Example_12345678." The values are data for the digital pass that are identified by their respective keys. The adaptive link 500 may have any numbers of query string parameters, including zero. The arrangement of query string parameters may be in any order.

When an end user activates the adaptive link 500, a network request 590 is sent to the digital pass management system that includes the information of the adaptive link 500. In FIG. 5, the network request 590 is shown as an HTTP request, although other forms of a network request are also possible. The network request 590 includes a header 592 and a body 594. In the header 592, the network request 590 may include information that identifies the device platform of the end-user device that sends the network request 590. For example, such information may be included in a user agent string 596 that may specify the browser and the operating system of the end-user device. The body 594 of the network request 590 may include the query string parameters (520-585).

After the digital pass management system receives the network request 590, the digital pass management system extracts and processes different information included in the network request 590. For example, the end-user device platform is identified through the information included in the user agent string 596. In the particular example shown in FIG. 5, the digital pass management system identifies that the end-user device operates on a device platform that is for the type of end-user devices 310, instead of another device platform for the type of end-user devices 320. Based on the user agent string 596, the first template 315 (shown and discussed in FIG. 3) is selected for the generation of the digital pass.

The digital pass management system also extracts information in different query string parameters that are included in the adaptive link 500. There may be two types of query string parameters, which are a reserved type and a non-reserved type.

Reserved type query string parameters are parameters whose keys are reserved for certain specific uses. A reserved key is fixed by the digital pass management system and normally is not changeable by a system customer. In the embodiment shown in FIG. 5, reserved keys include "barcode" 530, external ID "exid" 540, latitude "lat" 550, longitude "long" 560, and "tags" 585.

The key "barcode" 530 is reserved for carrying the precise value that is used to generate a barcode. For example, the precise value of the barcode in the example shown in FIG. 5 is "QR_Code_Example_12345678."

The key external ID "exid" 540 may be reserved for carrying information regarding the identification of the digital pass. For example, an "exid" parameter 540 may be used to identify the particular digital pass generated. The "exid" parameters 540 may also be used to identify unique end users. In such case, different digital passes that are generated for the same end user may be associated with the same "exid" value. The "exid" parameter 540 may further be used to identify a particular transaction or event that is associated with the generation of a series of digital passes. For example, an airlines company may want to identify all boarding passes associated with a single flight with the same "exid" value. In some implementations, the use of "exid" value allows the digital pass management system to set a total pass count ceiling for a particular transaction. For example, an airlines company may limit the generation of boarding passes related to a particular flight that is identified by the same "exid" value to the capacity of the flight. Likewise, a retail company may limit the generation of digital coupons to a certain number for a sales event that is identified by an "exid" value.

The keys latitude "lat" 550 and longitude "long" 560 are reserved for the identification of the location of the end-user device. Alternatively, or additionally, the location of the end-user device may also be determined by the IP address included in the header 592 of the network request 590. The location information may be used to generate different versions of a digital pass. A system customer of the digital pass management system may specify different variations of a digital pass that is based on the location of the end user. For example, a retail store chain may launch a nationwide sales event that varies among different geographical locations, the digital pass management system may provide different digital coupons that target the local sales event to different end users. In one case, a digital pass management system may allow up to 2000 distinctive location variations.

The key "tags" 585 is reserved for labeling and segmentation of digital passes. A certain group of digital passes can be provided with the same tag so that those passes can be identified together when the tag is provided. A digital pass may be associated with no tag or more than one tags. In the query string, different tags are separated by the symbol "~" tilde. In the example shown in FIG. 5, two tag values "christmas" and "shoes" are provided for the digital pass, which can be used to associate the digital pass to events that are related to Christmas and related to shoes.

While five different examples of reserved parameters are discussed, a digital pass management system may include fewer or additional parameter keys that are reserved for different purposes. For example, in one embodiments, reserved parameters may also include "endtime" and "barcode_alt_text." The key "endtime" may allow system customers to set an expiry date and/or time for the adaptive link to be valid to install a digital pass. The key "barcode_alt_text" may allow system customers to set the alternative text for a barcode.

Besides reserved parameters, query string parameters may also be non-reserved. Non-reserved parameters refer to keys that are set and customizable by the system customer. The parameters "name" 520, "date" 570, and "discount" 580 are non-reserved parameters. The keys of the non-reserved parameters may be present in a digital pass template to identify one or more personalizable fields in the templates. When creating a digital pass template, a system customer may specify a personalizable data field to be identifiable by a key. The key then may be used in non-reserved query string parameter to transmit data value intended for the personalizable data field.

Figure 6:
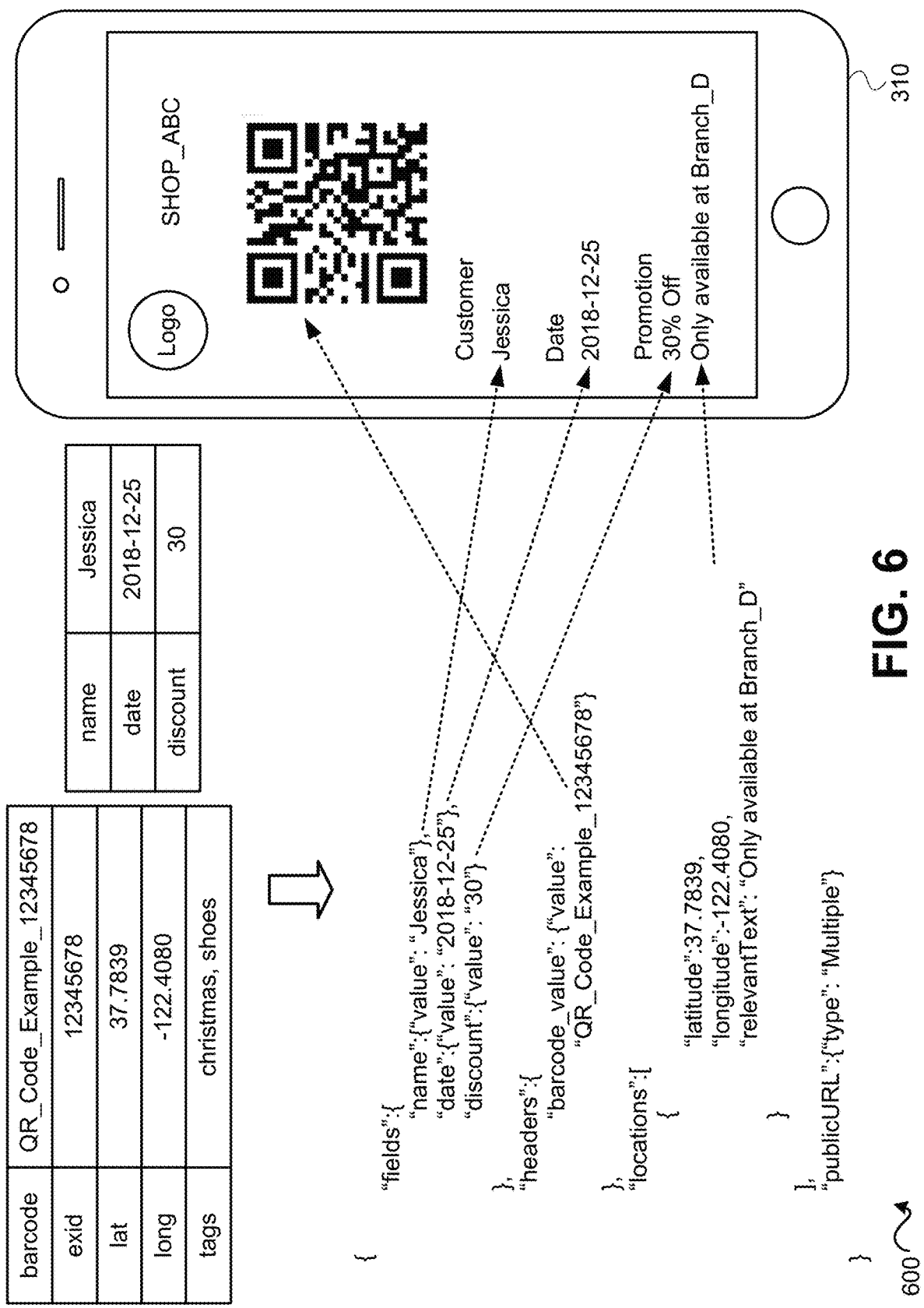
FIG. 6 is a graphical illustration of the generation of a digital pass, in accordance with an embodiment.

FIG. 6 is a graphical illustration of an example process for generating a digital pass after query string parameters are processed. FIG. 6 may be a continuation of the process illustrated in FIG. 5. After the data in the query string parameters (reserved or non-reserved) are extracted, the digital pass management system translates the data into a suitable data format. For example, in one embodiment, the data is translated into JSON format in accordance with a specific JSON schema. If the adaptive link 500 includes a parameter that is not recognized (e.g., the key is neither a reserved key nor a key that is defined by the system customer), the parameter may be disregarded.

The selection of the parameters values to be included in a JSON data set 600 depends on the types of parameters and the design of the digital pass template. Since device 310 is selected in FIG. 5, the illustration of the digital pass is based on the digital pass template 315 (shown and discussed in FIG. 3). If the template defines personalizable data fields that are identified by different keys, the values of query string parameters having the matched keys are to be included in the JSON data set. For example, the reserved key "barcode," and the non-reserved keys "name," "date," and "discount" both presents in the digital pass template 315 (see FIG. 3) and the query string parameters. Hence, the values "Jessica," "2018-12-25," and "30" are added to the JSON data set 600. The value of "barcode" parameter "QR_Code_Example_12345678" is also included in the JSON data set 600. Some values of query string parameters are not included in the JSON data set. For example, the value of "exid" and "tags" may be for digital pass administration purpose and are not included in the JSON data set. In some cases, the latitude and longitude data values in the JSON data set 600 are extracted from the query string parameters. In other cases, the latitude and longitude data values are determined from the IP address of the end-user device.

As a result, an example JSON data set in accordance with a predefined schema is shown below:

```
{
  "fields":{
    "name":{"value": "Jessica"},
    "date":{"value": "2018-12-25"},
    "discount":{"value": "30"}
  },
  "headers":{
    "barcode_value": {"value": "QR_Code_Example_12345678"}
  },
  "locations":[
    {
      "latitude":37.7839,
      "longitude":-122.4080,
      "relevantText": "Only available at Branch_D"
    }
  ],
  "publicURL":{"type": "Multiple"}
}
```

The JSON data set 600, combined with the digital pass template 315 (shown and discussed in FIG. 3), a digital pass may be generated. For example, the values "Jessica," "2018-12-15," and "30" are included in the personalizable data fields. The value of the barcode is translated into a QR code that is displayed in the barcode field in the digital pass template. The discount value "30" is also translated into "30% off" Some parameter values, such as location data "lat" and "long" are not directly displayed in the digital pass, but such information affects the text displayed in the digital pass. For example, based on the location information, the digital pass shows the string "Only available at Branch_D" below the string "30% Off."

The JSON data set 600 can be used to generate the digital pass based on the device platform. For example, in the case of an ANDROID platform is detected, a create pass API call is made to generate an ANDROID digital pass after which the resulting pass install URL is forwarded to the end-user device via an HTTP 302-redirect response with the body of the response being an ANDROID pass install URL. In the case of an iOS platform is detected, a create pass API call is made to generate an APPLE Wallet digital pass after which the resulting pass install URL is forwarded to the end-user device via an HTTP 302-redirect response with the body of the response being the APPLE Wallet pass install URL. In the case of a desktop computer, laptop computer, or an undetermined device is detected, in one embodiment no pass is generated. Instead, an HTTP 302-redirect response with the body of the response being a pre-determined fallback URL (such as a web browser or application landing page) is sent to the end-user device.

Figure 7:
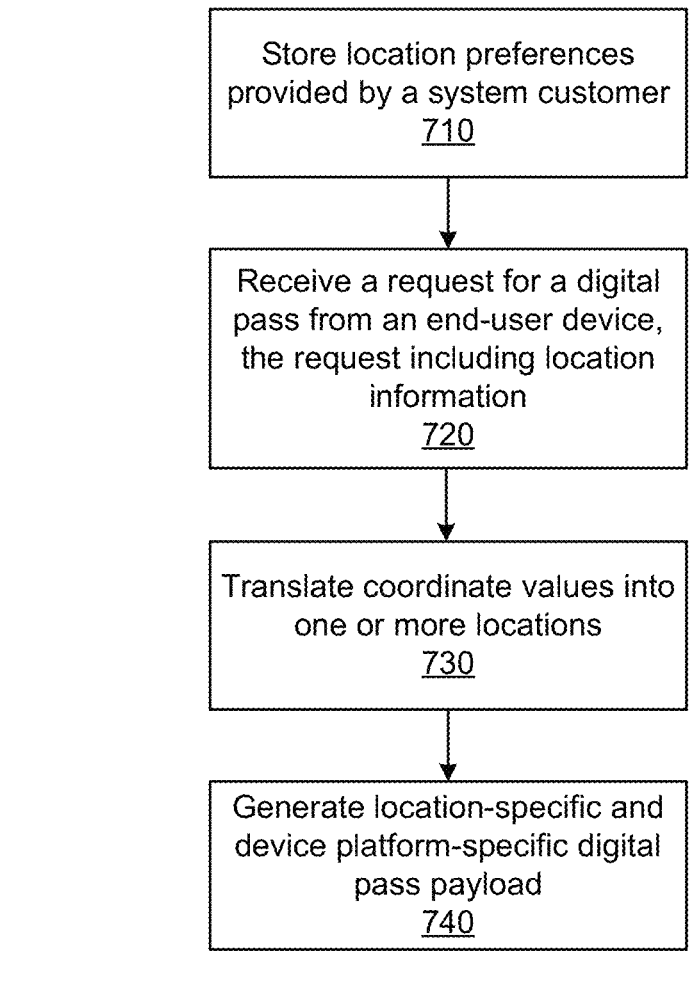
FIG. 7 illustrates a flowchart depicting a process for generating a location-specific digital pass, in accordance with an embodiment.

FIG. 7 is a flowchart depicting a process 700 for evaluating location details of an end-user device for the generation of a location-specific digital pass, in accordance with an embodiment. A digital pass management system stores location preferences (which may also be referred to as location rules) that are provided by a system customer. The location preferences may include a "location" key which contains locations set in the digital pass template configuration. The location preferences may also include a "locationRadius" key, which is intended to set a maximum distance (e.g., in integers and by miles) that a location can be selected from provided geographical coordinates. The location preferences may further include a "maxResultLocations" key, which specifies the maximum number of possible locations per pass.

In a digital pass generation process, the digital pass management system receives 720 a network request for a digital pass from an end-user device. The request includes the coordinate information of the end-user device in the form of query string parameters and/or being determined from the IP address. The digital pass management system takes the latitude and longitude information and translates 730 the coordinate values into one or more locations within certain miles of the coordinates. In one embodiment, up to ten locations may be selected. The one or more locations that satisfy the criteria set forth in the location preferences may be stored in the JSON data set. Based on the one or more locations, the digital pass management system generates 740 a location specific (and may also provide device platform specific) digital pass payload.

Hardware and System Implementation

Figure 8:
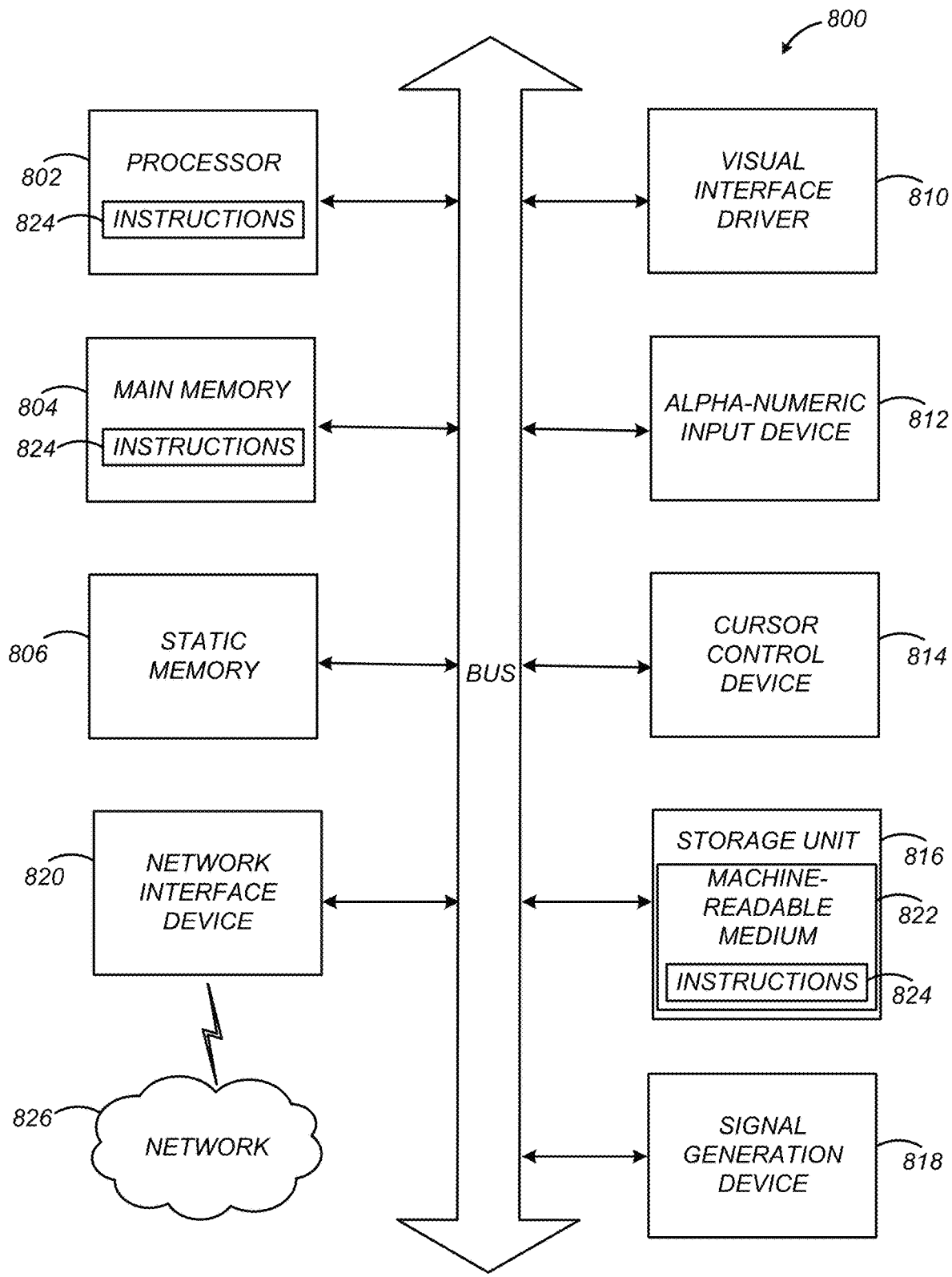
FIG. 8 illustrates an example processing machine for execution of processes disclosed.

FIG. 8 is a block diagram illustrating components of an example machine to read instructions from a computer-readable medium and execute them in a processor (or controller). The hardware system illustrated in FIG. 8 may correspond to any components, engines, modules, and processes described in FIGS. 1-7.

Specifically, FIG. 8 shows a diagrammatic representation of a machine in the example form of a computer system (processing system) 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804 and the storage unit 816 communicate via a bus 808.

In addition, the computer system 800 may include a static memory 806, a visual interface driver 810 (e.g., to drive display onto a surface for visual viewing such as a screen or projection unit that can display onto a surface). The computer system 800 may also include alphanumeric input device 112 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a non-transitory computer-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store the instructions 824. The term "computer-readable medium" shall also be taken to include any medium that is capable of storing instructions 824 for execution by the machine and that cause the machine to perform any one or more of the methodologies disclosed herein. The term "computer-readable medium" includes, but not be limited to, data repositories in the form of solid-state memories, optical media, and magnetic media.

Additional Considerations

This system allows system customers to create and distribute digital passes across end-user device platforms. It allows for the detection of the device location and the selection of pertinent locations to add to the pass. Additionally, it allows for the personalization of the pass by adding query string parameters while not needing to necessarily invoke an API call. It also allows for redirecting users to fallback URLs in case of input parameters not matching certain parameters, or simply redirecting based on platform. It further allows the system customers to set a maximum number of pass installs to limit the number of passes generated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, engines, modules, or mechanisms. Engines or modules may constitute either software modules (e.g., code embodied on a non-transitory computer-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion)

as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system or a process for personalized platform-specific content using a single URL through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for delivering digital passes, the method comprising:

storing, by a digital pass management system, a plurality of digital pass templates created by a digital pass publisher, the plurality of digital pass templates comprising a first digital pass template compatible with a first device platform and a second digital pass template compatible with a second device platform different from the first device platform;

receiving, by the digital pass management system, a network request from an end-user device for a digital pass, the network request being initiated by an activation of a uniform resource locator (URL) that is sent to the end-user device by the digital pass publisher, the URL comprising a parameter and a text value of a personalized data associated with the parameter, the text value generated by the digital pass publisher, the network request redirecting the parameter listed in the URL to the digital pass management system;

examining a header of the network request to determine that the end-user device operates on the first device platform, the header including a user agent string that includes information identifying the first device platform;

selecting the first digital pass template based on the user agent string included in the header of the network request;

parsing the text value of the personalized data in the URL to obtain the personalized data that is included in the text value listed in the URL that was activated by the end-user device;

generating a device platform-specific digital pass payload compatible with the first device platform using the first digital pass template; and transmitting the device platform-specific digital pass payload to the end-user device to generate a personalized digital pass, the personalized digital pass including the text value of the personalized data specified by the digital pass publisher.

2. The method of claim 1, wherein text value of the personalized data extracted from the URL includes a name of an end user.

3. The method of claim 1, wherein the first template comprises a personalizable data field that is identified by a key and the URL comprises a query string parameter being the parameter that identifies the personalized data using the key.

4. The method of claim 3, further comprising:
receiving the query string parameter included in the URL;
extracting the personalized data based on the key; and
including the text value of the personalized data value in the platform-specific digital pass payload, the personalized data value being associated with the personalizable data field that is identified by the key.

5. The method of claim 3, wherein the key is a reserved key selected from a group comprising: barcode, barcode alternative text, expiry date, external identifier, tag, latitude, and longitude.

6. The method of claim 3, wherein the key is a non-reserved key that is customizable by the digital pass publisher.

7. The method of claim 1, wherein the URL comprises information that identifies a geographical location and wherein the method further comprises:
generating the platform-specific digital pass payload based on the geographical location.

8. The method of claim 1, wherein the network request is a Hypertext Transfer Protocol (HTTP) request and the header is a header of the HTTP request.

9. The method of claim 1, further comprising:
receiving a second network request from a second end-user device, the second network request comprising information identifying that the second end-user device operates on a third device platform;
determining that none of the digital pass templates is compatible with the third platform; and
re-directing the second end-user device to a landing page.

10. The method of claim 1, wherein the platform-specific digital pass payload is a zip file that includes data of the personalized digital pass in JavaScript Object Notation (JSON) format.

11. A digital pass management system comprising:
a processor; and
a memory comprising instructions, the instructions executable by the processor, the instructions, when executed, cause the processor to:
store, by the digital pass management system, a plurality of digital pass templates created by a digital pass publisher, the plurality of digital pass templates comprising a first digital pass template compatible with a first device platform and a second digital pass template compatible with a second device platform different from the first device platform;
receive, by the digital pass management system, a network request from an end-user device for a digital pass, the network request being initiated by an activation of a uniform resource locator (URL) that is sent to the end-user device by the digital pass publisher, the URL comprising a parameter and a text value of a personalized data associated with the parameter, the text value generated by the digital pass publisher, the network request redirecting the parameter listed in the URL to the digital pass management system;
examining a header of the network request to determine that the end-user device operates on the first device platform, the header including a user agent string that includes information identifying the first device platform;
select the first digital pass template based on the user agent string included in the header of the network request;
parse the text value of the personalized data in the URL to obtain the personalized data that is included in the text value listed in the URL that was activated by the end-user device;
generate a device platform-specific digital pass payload compatible with the first device platform using the first digital pass template; and
transmitting the device platform-specific digital pass payload to the end-user device to generate a personalized digital pass, the personalized digital pass including the text value of the personalized data specified by the digital pass publisher.

12. The system of claim 11, wherein text value of the personalized data extracted from the URL includes a name of an end user.

13. The system of claim 11, wherein the first template comprises a personalizable data field that is identified by a key and the URL comprises a query string parameter being the parameter that identifies the personalized data using the key.

14. The system of claim 13, wherein the instructions further cause the processor to:
receive the query string parameter included in the URL;
extract the personalized data value based on the key; and
include the text value of the personalized data value in the platform-specific digital pass payload, the personalized data value being associated with the personalizable data field that is identified by the key.

15. The system of claim 13, wherein the key is a reserved key selected from a group comprising: barcode, barcode alternative text, expiry date, external identifier, tag, latitude, and longitude.

16. The system of claim 13, wherein the key is a non-reserved key that is customizable by the digital pass publisher.

17. The system of claim 11, wherein the URL comprises information that identifies a geographical location and wherein the instructions further cause the processor to:
generate the platform-specific digital pass payload based on the geographical location.

18. The system of claim 11, wherein the network request is a Hypertext Transfer Protocol (HTTP) request and the header is a header of the HTTP request.

19. The system of claim 11, wherein the instructions further cause the processor to:
receive a second network request from a second end-user device, the second network request comprising information identifying that the second end-user device operates on a third device platform;
determine that none of the digital pass templates is compatible with the third platform; and
re-direct the second end-user device to a landing page.

20. The system of claim 11, wherein the platform-specific digital pass payload is a zip file that includes data of the personalized digital pass in JavaScript Object Notation (JSON) format.

* * * * *